(Model.)

C. F. RANDALL.
CARRIAGE SHAFT SUPPORT.

No. 306,521. Patented Oct. 14, 1884.

WITNESSES:
Theo. G. Hoster
C. Sedgwick

INVENTOR:
C. F. Randall
BY Munn & Co.
ATTORNEYS.

United States Patent Office.

CHARLES F. RANDALL, OF SOUTH ABINGTON, MASSACHUSETTS.

CARRIAGE-SHAFT SUPPORT.

SPECIFICATION forming part of Letters Patent No. 306,521, dated October 14, 1884.

Application filed April 5, 1884. (Model.)

*To all whom it may concern:*

Be it known that I, CHARLES F. RANDALL, of South Abington, in the county of Plymouth and State of Massachusetts, have invented a new and Improved Carriage-Shaft Holder, of which the following is a full, clear, and exact description.

The object of my invention is to provide a new and improved device for holding the shafts of carriages or other vehicles raised at any desired inclination.

The invention consists in the combination, with a vehicle-axle, of a curved forked strip held on and projecting over the axle toward the front, and provided with adjustable screws or projections in the shanks, and of a clip secured on the axle, and provided with apertures for receiving the projections or screws on the forked strip.

Reference is to be had to the accompanying drawings, forming part of this specification, in which similar letters of reference indicate corresponding parts in all the figures.

Figure 1:
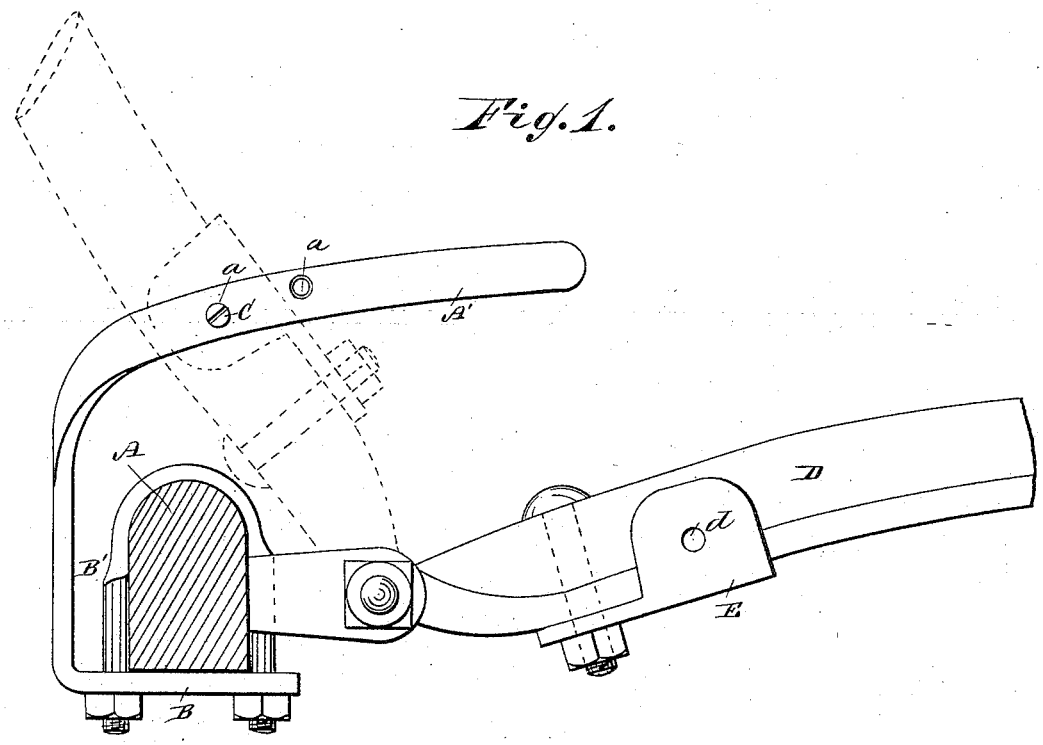
Figure 2:
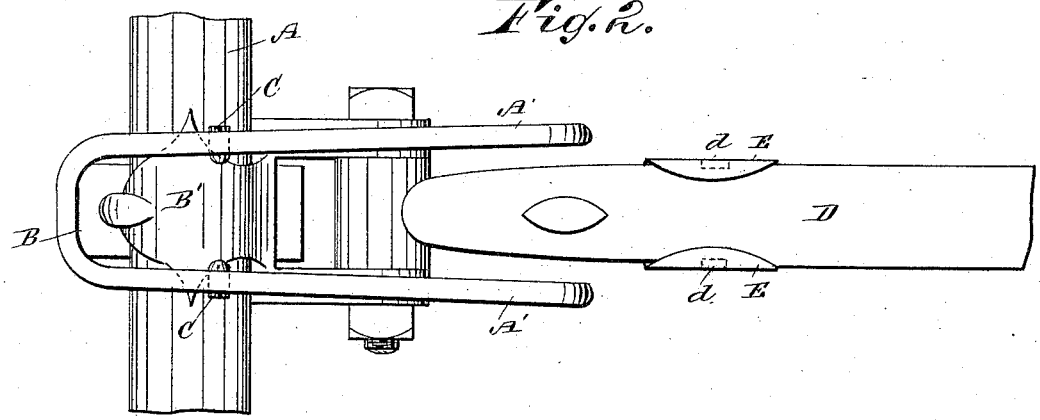

Figure 1 is a side view of my improved carriage-shaft holder. Fig. 2 is a plan view of the same.

To the bottom of the axle A a strip or plate B is held by the clip B', which strip is bent upward at the back of the axle, and then projects over the top of the axle toward the front, the upper part, A', of the strip B being forked. The strip B is made of steel or other suitable spring metal. Each shank of the forked part A' is provided with a series of apertures, $a$, in one of which, in each shank, a screw, C, is screwed, the inner end of the same being rounded or beveled.

On the bottom edge and each side edge of each shaft, D, a clip, E, is held, which is provided in each side with an aperture, $d$, for receiving the inner end of a screw, C. If the shaft is swung upward, it passes between the shanks of the forked part A', and the inner end of the screws C snap into the apertures $d$ in the clip E, thus holding the shaft erect. The shaft can be held at different inclinations by passing the screws C into different apertures $a$.

The above-described device can be attached to any vehicle.

I am aware that it is not new to provide a shaft-support for vehicles consisting of a pair of spring-arms bent toward each other near their outer ends to snap around the shafts when they are pressed between said spring-arms; and I do not claim such, broadly, as of my invention, as my invention is intended as an improvement thereon by allowing the shafts to be secured at different angles to suit the height of the carriage-house roof, and the height of the person that has to pass under the shafts in going around the carriage.

Having thus described my invention, what I claim as new, and desire to secure by Letters Patent, is—

1. The combination, with a vehicle-axle, of a curved forked strip held on the same and provided with adjustable projections, and of an apertured clip on the shaft, substantially as herein shown and described.

2. The combination, with a vehicle-axle, of the forked strip A', held on the same and projecting over the top of the axle toward the front, and provided with apertures $a$, the screws C, and of the clip E, held on the shaft and provided with apertures $d$, substantially as herein shown and described.

CHARLES F. RANDALL.

Witnesses:
SIDNEY O. COBB,
JOSIAH CUSHMAN.